(12) United States Patent
Schettino et al.

(10) Patent No.: US 8,095,630 B1
(45) Date of Patent: Jan. 10, 2012

(54) NETWORK BOOTING

(75) Inventors: John C. Schettino, San Jose, CA (US);
Jeffery A. Morgan, Cupertino, CA (US); Chandrasekar Venkatraman, Saratoga, CA (US); Miranda J. F. Mowbray, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1075 days.

(21) Appl. No.: 11/725,715

(22) Filed: Mar. 20, 2007

(51) Int. Cl.
*G06F 15/177* (2006.01)

(52) U.S. Cl. .................... 709/222; 709/223; 370/231

(58) Field of Classification Search .................. 709/229
See application file for complete search history.

(56) References Cited

U.S. PATENT DOCUMENTS

| | | | | |
|---|---|---|---|---|
| 7,143,087 | B2 * | 11/2006 | Fairweather | 707/3 |
| 7,441,113 | B2 * | 10/2008 | Chong et al. | 713/2 |
| 2004/0133640 | A1 * | 7/2004 | Yeager et al. | 709/204 |
| 2005/0180326 | A1 * | 8/2005 | Goldflam et al. | 370/231 |
| 2008/0133538 | A1 * | 6/2008 | Chavez et al. | 707/10 |
| 2008/0133666 | A1 * | 6/2008 | Chavez et al. | 709/205 |
| 2008/0320295 | A1 * | 12/2008 | Chong et al. | 713/2 |
| 2009/0248872 | A1 * | 10/2009 | Luzzatti et al. | 709/226 |

OTHER PUBLICATIONS

Incentives Build Robustness in Bit Torrent. Bram Cohen bram@bitconjurer.org. May 22, 2003.*

* cited by examiner

*Primary Examiner* — Firmin Backer
*Assistant Examiner* — Keyvan Emdadi

(57) ABSTRACT

A system for providing a network booting (NB) of at least one client therein is provided. The system includes a torrent-based peer-to-peer (P2P) system imposed on the network system, wherein the at least one client is a peer in the P2P system; and at least one host operable as a source in the torrent-based P2P system to provide at least one NB application to the at least one client through the torrent-based P2P system for network booting of the at least one client.

20 Claims, 4 Drawing Sheets

NETWORK BOOTING

CROSS-REFERENCE

This application is related to U.S. patent application Ser. No. 11/701,689, as filed on Feb. 2, 2007, and entitled "CHANGE MANAGEMENT."

BACKGROUND

Network booting is a process of booting a network client, such as a client computer, from a network rather than from a local drive of the computer. Thus, network booting involves the network client receiving and loading an initial network bootstrap program or software from the network, wherein this initial software program or application (hereinafter, "NB software") is provided by a network host, such as a host server, on the network. Typically, the NB software application includes an Operating System (OS) image. Other software applications may be included in the initial software for execution by the network client as well.

A major issue in a network booting environment or system having multiple clients is the ability to sufficiently provide network booting to such clients when needed. This is especially true for a network system, such as an information technology (IT) enterprise-wide network or system, wherein network booting is desired or required for thousands of network clients at once, and the initial software for network booting may be large due to the required size of the OS image and any other software application therein. Traditionally, the NB software is network loaded onto a network client from a network host through a Pre-boot Execution Environment (PXE or "pixie") boot using, for example, Trivial File Transfer Protocol (TFTP). PXE boot requires special servers that respond to network clients who are requesting a boot image. In a typical PXE boot, network clients may find or identify one or more network hosts that act as PXE boot servers by broadcasting or multicasting a Bootstrap Protocol (BootTP) or by a Dynamic Host Configuration Protocol (DHCP) request. The BootTP is a User Datagram Protocol (UDP) that may be employed by a network client to automatically obtain its Internet Protocol (IP) address from a network host that handles the network booting. Likewise, DHCP is another network protocol that may be employed by the network client to automatically obtain its IP address from the network host.

There is a desire to avoid what is known as the "slashdot effect," whereby a PXE boot server, such as a network host, or any other source or seed of the NB software, is inundated with multiple requests for network booting. This slashdot effect creates a scalability problem for traditional methods of network booting, wherein the NB software is centralized at one or more network hosts that provide network booting. In turn, each network host must have sufficient computing power and the network system must have sufficient bandwidth to accommodate network booting requests from the network clients. As more clients are connected to the hosts or the size of the NB software increases, infrastructure costs are incurred to necessarily upgrade the processing power of the network hosts and to increase the system bandwidth to accommodate the increased network traffic. This scalability problem is especially pronounced in, for example, an IT enterprise-wide network or data center that employs machine virtualization. In such a system, while there are only a few thousand nodes in the IT enterprise-wide network, such nodes may effectively run tens of thousand of virtual nodes that may require network booting to bring online. This kind of scale creates multiple localized slashdot effects within the IT enterprise-wide network.

Peer-to-peer, or P2P, file sharing technologies long have been used to support the sharing of large amounts of content between a potentially large community of nodes or users. Torrent-based P2P file sharing systems, such as BitTorrent, KTorrent, pTorrent, and BitComet, have emerged as systems of choice for distributing very large amounts of content across a data network such as the Internet. These P2P systems have allowed non-profit and open source organizations to avoid deploying large server farms and instead rely on a small number of mirror sites for content distribution to a P2P network.

BRIEF DESCRIPTION OF THE DRAWINGS

Embodiments are illustrated by way of example and not limited in the following figure(s), in which like numerals indicate like elements, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

As referred herein, and as understood in the art, information technology, or IT, encompasses all forms of technology, including but not limited to the design, development, installation, and implementation of hardware and software information systems and software applications, used to create, store, exchange and utilize information in its various forms including but not limited to business data, conversations, still images, motion pictures and multimedia presentations technology and with the design, development, installation, and implementation of information systems and applications.

Described herein are methods and systems for employing a torrent-based P2P distribution model, such as BitTorrent, to effectively and efficiently provide network booting to multiple clients in a given network system, such as an IT enterprise-wide network. According to various embodiments, a network booting tool (hereinafter, "NB tool") is provided that is scalable to provide network booting to clients in network systems of different sizes without the need to increase the system bandwidth and associated cost. The scalability of the network booting tool also allows it to accommodate a machine virtualization system wherein network booting may need to be provided to multiple virtual machines therein.

Figure 1:
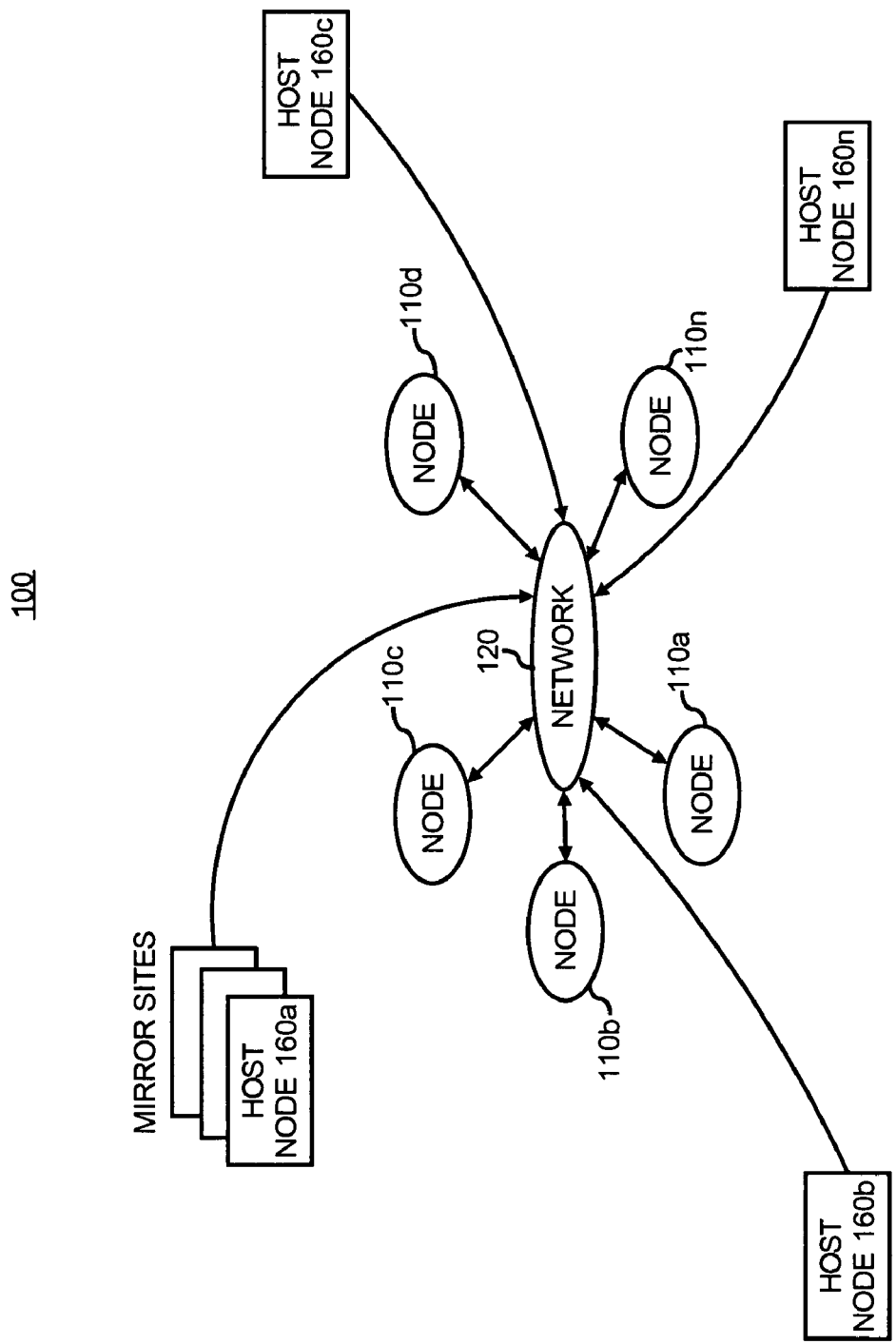
FIG. 1 illustrates an exemplary block diagram of a network system for providing network booting, in accordance with one embodiment.

FIG. 1 illustrates an exemplary block diagram of a network system 100, such as an IT enterprise-wide network, wherein an embodiment of the present invention may be practiced. It should be readily apparent to one of ordinary skill in the art that the network system 100 represents a generalized schematic illustration and that other components may be added or existing components may be removed or modified without departing from the spirit or scope of the present invention.

The network system 100 includes a plurality of client nodes 110a-n. Imposed on the system 100 is a torrent-based P2P system with network clients, represented by the client nodes 110a-n, forming peers therein, in accordance with one embodiment. The client nodes 110a-n are network clients operable to exchange information among themselves and with other network nodes over a network 120. The client nodes 110a-n may be physical or virtual computing platforms (e.g., personal digital assistants, laptop computers, workstations, servers, multiple virtual machines hosted on one or more physical machines, and other similar devices) in a managed system. Each of the nodes 110a-n also may be a managed system having other nodes therein. The nodes 110a-n are operable to execute one or more software applications (not shown) that include the capability to share information (e.g., data, applications, etc.) in a P2P manner as further discussed later.

The network 120 is operable to provide a communication channel among the client nodes 110a-n. The network 120 may be implemented as a local area network (LAN), a wide area network (WAN), or any combination thereof. Furthermore, the network 120 may be a private network, such as an intranet, or a public network, such as the Internet. The network 120 may implement wired protocols, such as Ethernet, token ring, etc., wireless protocols, such as cellular digital packet data, Mobitex, IEEE 801.11 family, Bluetooth, Global System for Mobiles, etc., or any combination thereof.

In one embodiment, a NB tool is employed in the system 100 to facilitate delivery of NB software to the network clients, such as the client nodes 110a-n, to provide network booting of such clients. The NB tool provides one or more network hosts, represented by the host nodes 160a-n, each functioning as a source, or seeder, of one or more NB software packages that may be available to the client nodes 110a-n via the network 120. Thus, in one embodiment, the host nodes 160a-n initially have stored therein the necessary NB software for network booting the client nodes 110a-n. The host nodes 160a-n may be computing platforms, as noted above, that have a network interface for communication with the network 120. The network host nodes 160a-n are operable to execute one or more software applications (not shown) that include the capability to store and share information in a P2P manner as further discussed later. Thus, the host nodes 160a-n are also peers in the torrent-based P2P system that is imposed on the network system 100. One or more system administrators may implement and maintain one or more of the host nodes 160a-n so as to provide network booting of the network clients. A system administrator may be an owner or administrator of the network system 100 or any other entity authorized to operate or maintain the network system 100 and one or more of the network hosts and clients therein. Each of the host nodes 160a-n may further include one or more mirror sites to provide redundant or backup sources of network booting in the same manner as the host nodes 160a-n to accommodate additional network clients in the network system 100.

For simplicity, the network booting operations in the network system 100 are further discussed below with reference to a running example in which the network booting (with the associated NB software) is provided by a host node 160a to a client node 110a. However, it should be understood that such a discussion is also applicable for network booting all client nodes 110a-n by one or more host nodes 160a-n. For example, one or more of the host nodes 160a-n are operable to provide network booting with the same OS to all client nodes 110a-n. In another example, the host node 160a is operable to provide network booting with a first OS (e.g., Microsoft Windows) to a first subset of the client nodes 110a-n, the host node 160b is operable to provide network booting with a second OS (e.g., Linux) to a second subset of the client nodes 110a-n, the host node 160c is operable to provide network booting with a third OS (e.g., Unix) to a third subset of the client nodes 110a-n, and so on. Thus, the OS images are located at the host nodes 160a-n and available for download to the client nodes 110a-n for network booting of the network clients. In a torrent-based P2P system, the host nodes 160a-n are the seeders or full peers, and the client nodes 110a-n are initially the empty peers or leechers of a P2P torrent that is created for each network booting. As referred herein, a seeder or full peer is a peer in a P2P system that has a complete copy of a particular content, such as a software update, and offers it for downloads by others in the peer. Whereas, an empty peer or a leecher is a peer in a P2P system that does not have a complete copy of a particular content and operates to only download such particular content. Each of the client nodes 110a-n is initially provided with a torrent client software agent (hereinafter, "torrent agent") for contacting the appropriate source for network booting. A torrent-based P2P system may be effectively created in the network system 100 based on the torrent agents provided at each of the nodes 110a-n.

When a client node, e.g., 110a, is powered up, its firmware is executed to locate and contact a predetermined one of the host nodes 160a-n, e.g., the host node 160a, for network booting therefrom. The contacted host node 160a is operable to either provide network booting of the client node 110a by providing the latter with the requisite NB software for network booting or refer it to other client nodes 110b-n that have already received the NB software, in accordance with predetermined network booting rules or policies. Once the client node 110a has received the NB software for network booting, it is also operable to become a full peer or seeder, like the contacted host node, for that particular network boot. Thus, the file-sharing behavior of the client nodes 110a-n, which are now peers in a torrent-based P2P system, may be defined so as to measure and control the bandwidth utilization that is maintained by the host node 160a. Consequently, network booting may be tuned to provide system scalability by reducing load on a central resource hosting the boot images, optimizing network boot times of a large community of physical or virtual network clients, and minimizing costly infrastructure upgrades.

Figure 3:
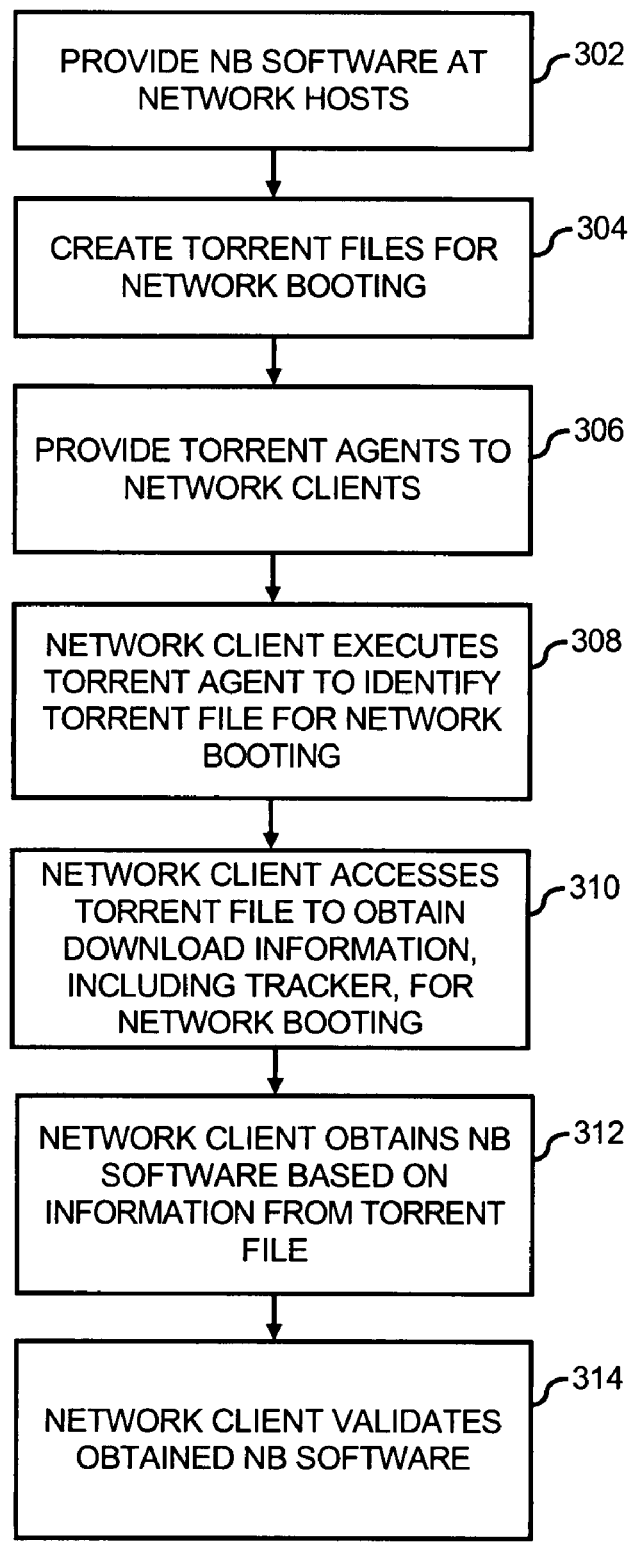
FIG. 3 illustrates method for providing network booting of network clients in a network system, in accordance with another embodiment.

FIG. 3 illustrates a method 300 for employing a torrent-based P2P distribution model or system to provide network booting services in a desired network system, such as the network system 100 in FIG. 1, in accordance with one embodiment. For illustrative purposes only and not to be limiting thereof, the method 300 is discussed in the context of the network system 100.

At 302, the requisite NB software is provided or stored at one or more of the network hosts, such as the host nodes 160a-n. In one embodiment, identical NB software packages may be provided to all of the host nodes 160a-n. For example, the same OS image and other software applications may be provided to all of the host nodes 160*a-n*. In another embodiment, different NB software packages may be provided to the host nodes 160*a-n*. For example, the NB software package stored at each of the host nodes 160*a-n* may include a different OS image to provide different operating systems to the network clients 110*a-n*. Alternatively, the same OS image may be provided by the host nodes 160*a-n* but with different software applications to enable the network clients 110*a-n* to execute different software applications with the same operating system. A system administrator of the network system 100 may initially store an NB software package at each of the host nodes 160*a-n*.

At 304, the system administrator creates a torrent file for the distribution of each NB software package through a torrent-based P2P system. As understood in the art, a torrent file contains metadata about the desired content to download, including, for example, names or identifiers for the data pieces (e.g., files) in the NB software package, their lengths, and the hash code or checksum (or any other security checks) of each data piece. This metadata may be used by the clients 110*a-n* in the system 100 to verify the integrity of the data they receive. The torrent file also contains an address or pointer to a tracker, which is a file, server, or any other storage medium that manages the torrent download and assists the clients to find where to obtain the data pieces identified in the torrent file. The tracker is also operable to provide information identifying the initial source or seeder for each torrent file. The torrent file and associated tracker may be located at the same location, such as in the same server like one of the host nodes 160*a-n*. They are provided and maintained by the system administrator.

In one embodiment, the system administrator provides a torrent file for each type of network booting or each type of NB software package that it offers. For example, if the system administrator provides NB software packages with different OS images therein as exemplified earlier, it also provides multiple torrent files with a one-to-one correspondence to the different NB software packages. Referring to the running example, the system administrator stores a NB software package at the host node 160*a* for network booting of a client node 110*a* in the system 100 and also creates a torrent file for the network booting. This torrent file contains metadata for the requisite NB software package for network booting, such as names of one or more files required for the network booting, their lengths, and their checksums. It also contains an address such as a uniform resource locator (URL) for the associated tracker that is associated with the torrent file. In turn, the tracker provides information identifying the host node 160*a* as the initial source or seeder that contains the actual NB software package needed for network booting of the client node 110*a*. In one embodiment, both the torrent file and its associated tracker for network booting may reside in the host node 160*a*. Alternatively, the torrent file and its associated tracker may reside at a location or locations different from the host nodes 160*a*.

At 306, the system administrator also provides torrent agents to the client nodes 110*a-n*. In one embodiment, the torrent agents may be provided through PXE boots by the client nodes 110*a-n* at power up. For example, when a client node 110*a* is powered up, its firmware attempts to identify a network host, such as the host node 160*a*, that acts as PXE boot server by broadcasting or multicasting a BootTP or DHCP request in a manner similar to a conventional PXE boot. When the host node 160*a* receives such a request, it provides a torrent agent for downloading to the client node 110*a* instead of the usual file path for the client node 110*a* to download the NB software package in a conventional PXE boot. In an alternative embodiment, the torrent agent may be pre-coded in the firmware previously supplied to the client node 110*a* by the system administrator. The client nodes 110*a-n* are operable to execute torrent agents therein to locate the torrent files that have been created for available NB software packages that may be downloaded for network booting.

At 308, once a network client, such as a client node 110*a*, is powered up and a torrent agent is provided, it executes the provided torrent agent to identify and locate the torrent file for network booting. For example, the torrent file is located at the host node 160*a*.

At 310, the client node 110*a* employs its torrent agent to access information from the identified torrent file to obtain download information for the NB software package in order to effect a network boot of the client node 110*a*. As noted earlier, the identified torrent file includes metadata about the corresponding NB software package to download for a network boot of the client node 110*a* and a pointer to an associated tracker. As noted earlier, the tracker manages the torrent download and directs the clients to the peers they may use to obtain the data pieces identified in the torrent file. Thus, as understood in the art, the tracker contains a list of peers in the torrent-based P2P system that are currently sharing the content, e.g., the NB software package, that is associated with the torrent file and coordinates communication between the shared peers. These shared peers together form a swarm or torrent community that is associated with the torrent file. The swarm also includes the original source, or initial seeder, of the network booting content. For example, the node 110*a* accesses the torrent file in the host node 160*a*, which points to an associated tracker also in the host node 160*a*. The tracker provides a swarm of shared peers for the software update, wherein one of the peers is the host node 160 (or mirror site thereof) as the initial seeder. The swarm also may include any of the nodes 110*a-n* that have become seeders, after having downloaded part or all of the NB software package. The node 110*a* is then able to request the requisite NB software package for network booting from the original source or seeder (e.g., the host node 160*a*), from one of the other nodes 110*b-n* that have turned seeders, or from both.

At 312, the node 110*a* obtains a NB software package from the torrent-based P2P system based on the information found in the associated torrent file, including the source(s) for the NB software package as listed in the tracker. Thus, the NB software package is provided by the source listed in the tracker. For example, the node 110*a* downloads a NB software package from the swarm or torrent community in accordance with the associated torrent file and tracker, in a manner consistent with content sharing in a torrent-based P2P system. If the node 110*a* is the first client node in the network system 100 to receive the software update content, it will receive such a content from the initial seeder, the host node 160*a*. If one or more other client nodes in the network system 100 already received all or a part of the NB software package, the node 110*a* may receive such a package from either the host node 160*a*, the one or more other nodes, or both in accordance with a download policy at the initial seeder, that is, the host node 160*a*, and programmed in the tracker associated with the NB software package.

In one embodiment, the system administrator is able to set up the download policy for each network booting source (i.e., initial seeder of each NB software package) as to the number of network clients (e.g., the nodes 110*a-n*) each network booting source is capable of accepting for concurrent network booting, e.g., concurrent downloads of the NB software package. Thus, the system administrator is able to leverage the implemented torrent-based P2P system and the download policy to achieve cost saving measures. For example, the system administrator may set up a download policy that relies more on subsequent seeders in the torrent-based P2P system to provide the NB software package for network booting. Such a download policy may dictate that only a predetermined number of network clients can concurrently download the NB software package from the initial seeder, with the rest downloading from other seeders, or that after full downloads to a given number of clients, the initial seeder will redirect all download requests to such clients (who have become seeders after the full downloads). Thus, the system administrator may reduce cost by implementing an initial seeder with lower computing and bandwidth powers than that typically found in a centralized download server of a conventional content delivery system. In another example, a download policy may be set up to require client nodes to remain in the swarm until all peers therein have received the full NB software package. Such a download policy ensures that multiple sources or seeders are available in the swarm for all peers therein to receive the requisite NB software package.

At 314, the node 110a may validate the received NB software package by comparing information from the received NB software package with the metadata about the NB software package as found in the torrent file accessed at 312. For example, the node 110a validates the downloaded NB software package by comparing the hash code or checksum of each downloaded data piece or chunk of the NB software package, as received from the initial seeder, one or more of the other nodes, or both, and the hash code or checksum found in the torrent file for such a NB software package.

The aforementioned method 300 has been described with reference to a tracker-type, torrent-based P2P system that employs a dedicated tracker to manage the torrent download and direct the clients to the peers they use to obtain the data pieces identified in each torrent file. Thus, because the system administrator provides and maintains the torrent file, its associated tracker, and the initial seeder for network booting, it exhibits centralized control over the network booting of the network clients in the system 100 to ensure that those clients receiving the NB software packages for network booting are indeed valid clients. It also provides assurance that those valid clients become valid seeders listed in a valid tracker once they have received all or a part of a NB software package. These subsequently-turned seeders are listed as valid sources in the associated tracker as maintained by the system administrator. Thus, any authorized client that is provided with a torrent agent is able to trust the source or sources of network booting as listed in the associated tracker, whether such a source is an initial seeder, as provided and maintained by the system administrator (e.g., a host node 160a), or one of the subsequently-turned seeders (e.g., one or more of the nodes 110a-n).

Figure 2:
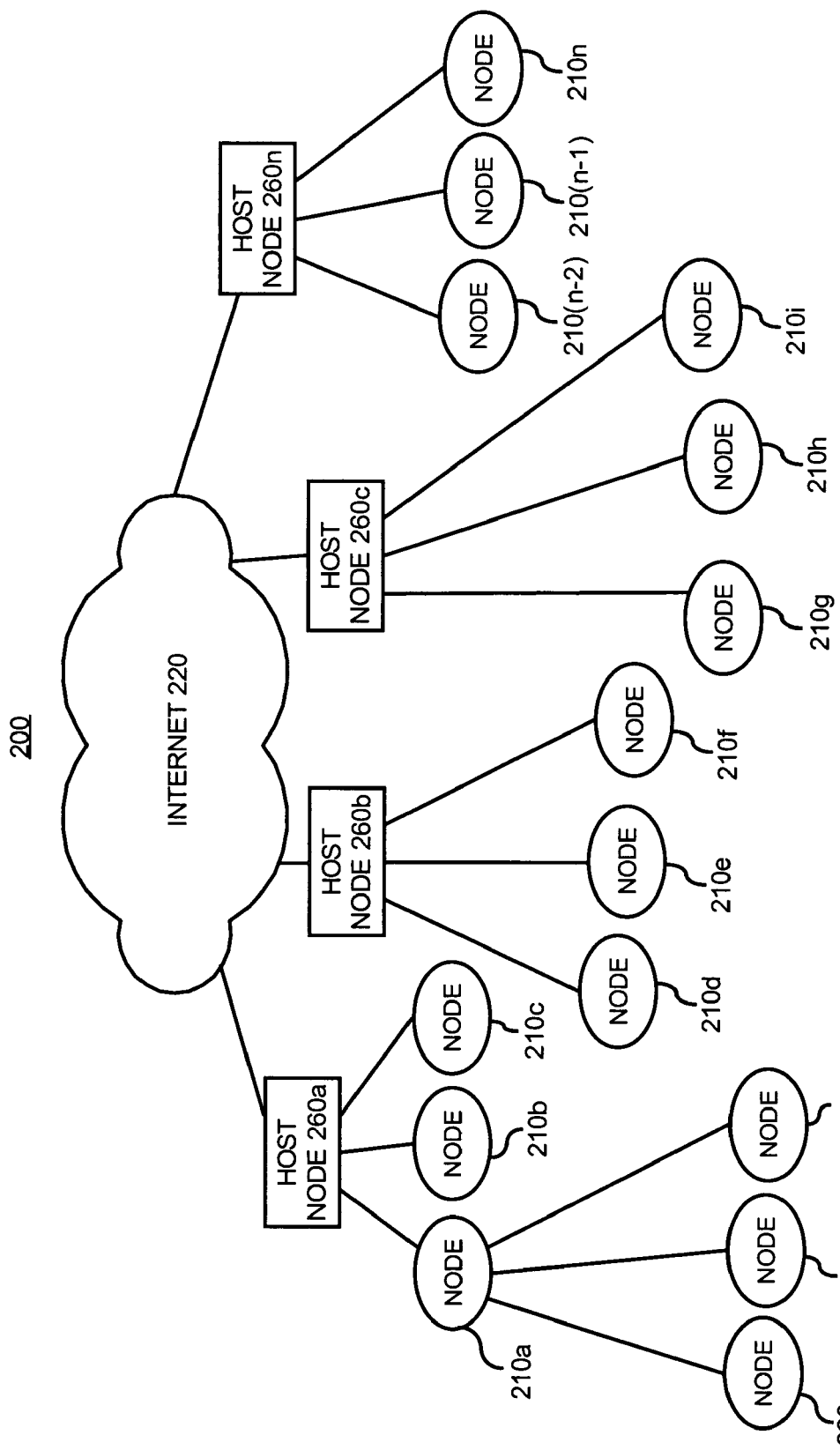
FIG. 2 illustrate an exemplary block diagram of a network system for providing network booting, in accordance with another embodiment.

With minor modifications, the method 300 is scalable to take advantage of any network topology of an underlying system. FIG. 2 illustrates another network system 200 for which the method 300 may be scaled. The network system 300 includes a plurality of client nodes 210a-n (operating in the same manner as described earlier for the client nodes 110a-n in FIG. 1) and a plurality of host nodes 260a-n (operating in the same manner as described earlier for the host nodes 160a-n in FIG. 1). Also imposed on the system 300 is a torrent-based P2P system with the client nodes 210a-n and host nodes 260a-n forming peers therein. As shown, the network topology of the system 200 is different from that of the system 100 because the client nodes 210a-n in the system 200 are organized into subnetworks (or subnets), wherein the client nodes in each subnet is subject to network booting from one of the host nodes 260a-n. Each of the client nodes 210a-n may be organized into a subnet as designated by its firmware, which is also used to initiate a network booting from a designated host node (260a-n) as described at 206 above. For example, the client nodes 210a-c are organized into a first subnet that is subject to network booting from the host node 260a, the client nodes 210d-f are organized into a second subnet that is subject to network booting from the host node 260b, and so on. Furthermore, each of the client nodes 210a-n also may act as a seeder for network booting nodes in a lower subnet. For example, the client node 210a may act as a seeder for network booting the client nodes 230a-c. Thus, only those data pieces or chunks of a NB software package that already has been downloaded to the client node 210a are available to the client nodes 230a-c.

In one embodiment, the host nodes 260a-n in the system 200 do not initially store the NB software packages for network booting the client nodes 210a-n. For example, the network system 200 is an intranet with limited portals to an external network, such as the Internet 220 for security purposes. Thus, only the host nodes 260a-n operate as portals to receive, via the Internet 220, the NB software packages from one or more sources external to the network system 200. Accordingly, step 302 in the method 300 of providing NB software to the network hosts no longer involves the initial storage of the NB software at the host nodes 260a-n. Instead, in one embodiment, the host nodes 260a-n may employ conventional PXE boots to obtain the NB software packages prior to distributing such packages to the client nodes 210a-n in a manner as described in the method 300. Alternatively, the host nodes 260a-n may operate as initial empty peers or leechers in a second P2P network, like the client nodes 210a-n in a manner as described in the method 300, to initially obtain the NB software packages from one or more sources external to the network system 200. In this alternative embodiment, the host nodes 260a-n and the external source are peers in the second P2P system, which may be a different P2P system or the same torrent-based system in which the host nodes 260a-n and the client nodes 210a-n are peers. Once the host nodes 260a-n are provided with the NB software packages, the method 300 may be employed again to distribute such packages to the client nodes 210a-n. In effect, the host nodes 260a-n and the client nodes 110a-n are all client nodes.

Figure 4:
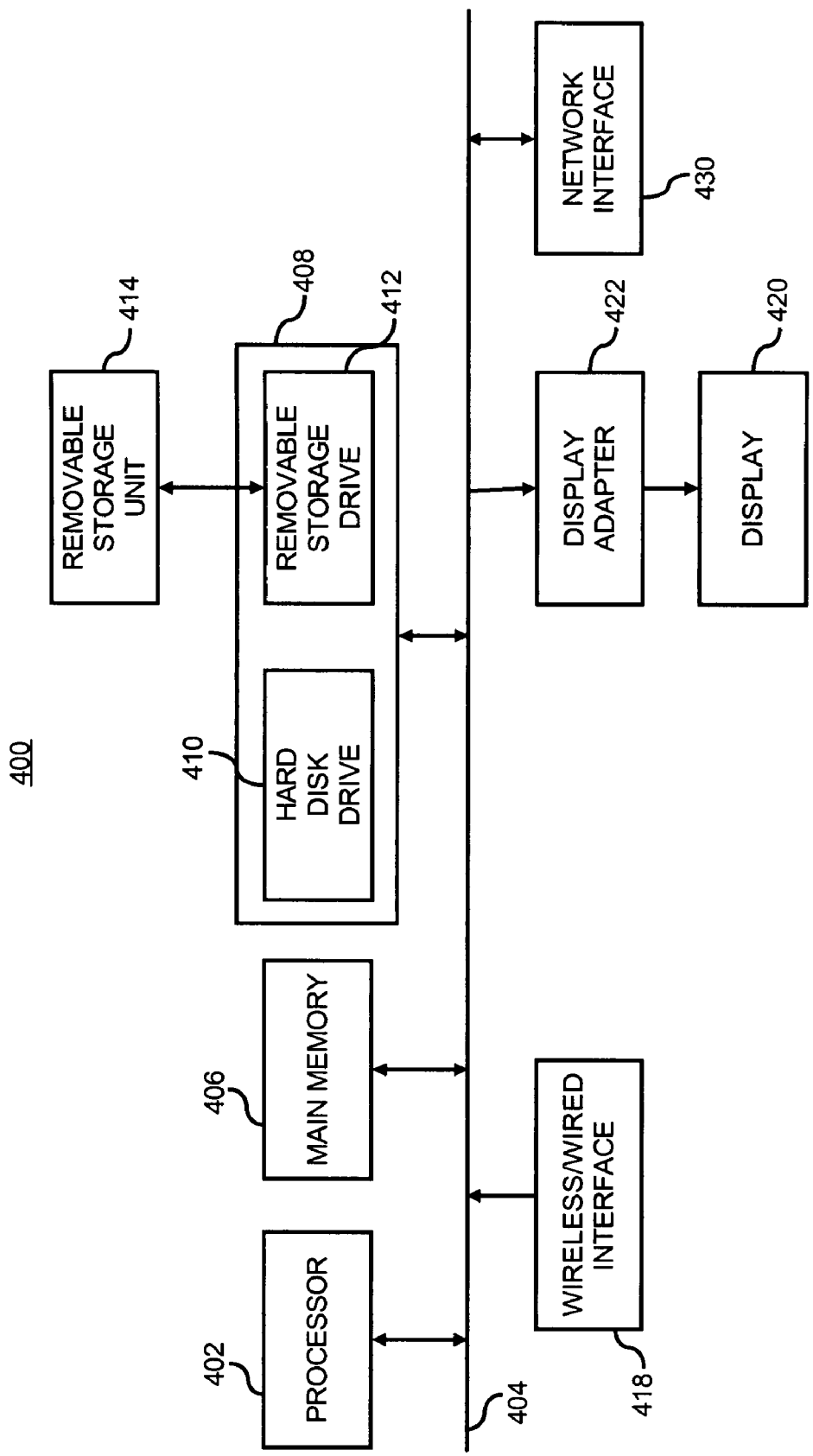
FIG. 4 illustrates a block diagram of a computerized system that is operable to be used as a platform for implementing one or more components in the systems illustrated in FIGS. 1 and 2 and a method illustrated in FIG. 3.

FIG. 4 illustrates a block diagram of a computerized system 400 that is operable to be used as a platform for implementing any of the host nodes 160a-n or 260a-n or client nodes 110a-n or 210a-n and the method 300. It should be understood that a more sophisticated computerized system is operable to be used. Furthermore, components may be added or removed from the computerized system 400 to provide the desired functionality.

The computer system 400 includes one or more processors, such as processor 402, providing an execution platform for executing software. Thus, the computerized system 400 includes one or more single-core or multi-core processors of any of a number of computer processors, such as processors from Intel, AMD, and Cyrix. As referred herein, a computer processor may be a general-purpose processor, such as a central processing unit (CPU) or any other multi-purpose processor or microprocessor. A computer processor also may be a special-purpose processor, such as a graphics processing unit (GPU), an audio processor, a digital signal processor, or another processor dedicated for one or more processing purposes. Commands and data from the processor 402 are communicated over a communication bus 404. The computer system 400 also includes a main memory 406 where software is resident during runtime, and a secondary memory 408. The secondary memory 408 may also be a computer-readable medium (CRM) that may be used to store software programs, applications, or modules that implement the methods 200 and 300, or parts thereof. The main memory 406 and secondary memory 408 (and an optional removable storage unit 414) each includes, for example, a hard disk drive and/or a removable storage drive 412 representing a floppy diskette drive, a magnetic tape drive, a compact disk drive, etc., or a nonvolatile memory where a copy of the software is stored. In one example, the secondary memory 408 also includes ROM (read only memory), EPROM (erasable, programmable ROM), EEPROM (electrically erasable, programmable ROM), or any other electronic, optical, magnetic, or other storage or transmission device capable of providing a processor or processing unit with computer-readable instructions. The computer system 400 includes a display 420 connected via a display adapter 422, user interfaces comprising one or more input devices 418, such as a keyboard, a mouse, a stylus, and the like. However, the input devices 418 and the display 420 are optional. A network interface 430 is provided for communicating with other computer systems via, for example, the network 120.

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A network system for providing a network booting (NB) of at least one client therein, comprising:
   a torrent-based peer-to-peer (P2P) system imposed on the network system, wherein the at least one client is a peer in the P2P system; and
   at least one host operable as a source in the torrent-based P2P system to provide at least one NB application to the at least one client through the torrent-based P2P system for network booting of the at least one client,
   wherein the torrent-based P2P system includes a torrent file associated with the network booting, the torrent file containing metadata related to the at least one NB application and a pointer to a tracker that identifies the at least one host containing the at least one NB application, and
   wherein the at least one client is provided with a torrent agent operable to identify the torrent file, obtain the metadata related to the at least one NB application and the pointer to the tracker from the identified torrent file, receive the at least one NB application from the at least one host based on the obtained tracker, and validate the received NB application using the obtained metadata.

2. The network system of claim 1, wherein the at least one client includes a plurality of clients that are peers in the imposed torrent-based P2P system, wherein a first one of the plurality of clients is operable as a source in the torrent-based P2P system to provide the NB application to the remaining ones of the plurality of clients once the first one receives at least a part of the NB application from the at least one host.

3. The network system of claim 2, wherein:
   the plurality of clients are organized into a plurality of subnetworks in the network system, each of the subnets includes at least one of the plurality of clients; and
   the at least one host includes a plurality of hosts operable as sources in the torrent-based P2P system to provide multiple NB applications, each of the plurality of NB applications provides network booting to a corresponding one of the plurality of subnetworks.

4. The network system of claim 1, wherein the at least one NB application is initially stored on the at least one host, and the at least one host is an original source of the at least one NB application.

5. The network system of claim 1, wherein the at least one host is operable to receive the at least one NB application from a source external to the network system prior to providing the at least one NB application to the at least one client.

6. The network system of claim 5, wherein the at least one host is operable as a peer in another P2P system, in which the external source is also a peer, and the at least one NB application is provided to the at least one host through the another P2P system.

7. The network system of claim 5, wherein the at least one host is operable to receive the at least one NB application from the external source via a Pre-boot Execution Environment (PXE) boot prior to providing the at least one NB application to the at least one client.

8. A method for providing network booting of a plurality of network clients in a network system, comprising:
   providing a first network booting (NB) application at a first network host in the network system;
   creating a first torrent file for distribution of the first NB application from the first network host to at least a first one of the plurality of network clients through a torrent-based P2P system, wherein the first torrent file includes metadata related to the first NB application and a pointer to a tracker, wherein the tracker identifies the first network host containing the first NB application;
   providing a first torrent agent to the first network client for accessing the first torrent file to obtain the metadata related to the first NB application and the pointer to the tracker;
   receiving a request for the first NB application from the first network client based on the accessed first torrent file;
   providing the first NB application to the first network client, for network booting of the first network client, through the torrent-based P2P system in accordance with the first torrent file; and
   providing validation of the first NB application as received by the first network client using the obtained metadata,
   wherein the first torrent agent is executed by the first network client to identify the first torrent file, and the identified torrent file is accessed by the first network client to obtain the pointer to the tracker.

9. The method of claim 8, wherein providing the first NB application from the first network host comprises:
   providing the first NB application from the first network host to the first network client based on a predetermined policy limiting a number of downloads of the first NB application from the first network host to the plurality of network clients.

10. The method of claim 8, further comprising:
    providing at least a first portion of the first NB application from a second one of the plurality of network clients to the first network client through the torrent-based P2P system in accordance with the first torrent file.

11. The method of claim 8,
    wherein providing validation of the first NB application as received by the first network client includes comparing information from the first NB application received by the first network client with the obtained metadata.

12. The method of claim 10, wherein providing validation includes providing validation first portion of the first NB application as received by the first network client from the second network client.

13. The method of claim 10, further comprising:
providing the first portion of the first NB application from the first network host to the second network client through the torrent-based P2P system in accordance with the first torrent file prior to providing the first portion of the first NB application from the second network client to the first network client.

14. The method of claim 8, further comprising:
providing a second NB application at a second network host in the network system;
creating a second torrent file for distribution of the second NB application from the second network host to at least a second one of the plurality of network clients through a torrent-based P2P system;
providing a second torrent agent to the second network client for accessing the second torrent file;
receiving a request for the second NB application from the second network client; and
providing the second NB application to the second network client, for network booting of the second network client, through the torrent-based P2P system in accordance with the second torrent file.

15. The method of claim 8, wherein providing the first NB application at the first network host comprises one of:
providing the first NB application at the first network host via a Pre-boot Execution Environment (PXE) boot from a source external to the network system; and
providing the first NB application at the first network host via another P2P system from a source external to the network system, wherein the first network host and the external source are peers in the another P2P system.

16. The method of claim 8, wherein providing the first torrent agent to the first network client for accessing the first torrent file comprises:
providing the first torrent agent in a firmware of the first network client.

17. The method of claim 8, wherein providing the first torrent agent to the first network client for accessing the first torrent file comprises:
providing the first torrent agent via a Pre-boot Execution Environment (PXE) boot from the first network host.

18. The method of claim 8, wherein the first NB application includes:
an operating system image for a network boot of the first network client; and
at least one additional application for execution by the first network client subsequent to the network boot.

19. A computer readable storage device on which is encoded program code for providing network booting of a plurality of network clients in a network system, the encoded program code is executed to:
provide a first network booting (NB) application at a first network host in the network system;
create a first torrent file for distribution of the first NB application from the first network host to at least a first one of the plurality of network clients through a torrent-based P2P system, wherein the first torrent file includes metadata related to the first NB application and a pointer to a tracker, wherein the tracker identifies the first network host containing the first NB application;
provide a first torrent agent to the first network client for accessing the first torrent file to obtain the metadata related to the first NB application and the pointer to the tracker;
receive a request for the first NB application from the first network client;
provide the first NB application to the first network client, for network booting of the first network client, through the torrent-based P2P system in accordance with the first torrent file; and
providing validation of the first NB application as received by the first network client by comparing information from the first NB application received by the first network client with the obtained metadata,
wherein the first torrent agent is executed by the first network client to identify the first torrent file, and the identified torrent file is accessed by the first network client to obtain the pointer to the tracker.

20. The network system of claim 1, wherein the at least one client is operable to validate the received NB application by comparing information from the received NB application with the obtained metadata.

* * * * *

UNITED STATES PATENT AND TRADEMARK OFFICE
CERTIFICATE OF CORRECTION

| | | |
|---|---|---|
| PATENT NO. | : 8,095,630 B1 | Page 1 of 1 |
| APPLICATION NO. | : 11/725715 | |
| DATED | : January 10, 2012 | |
| INVENTOR(S) | : John C. Schettino et al. | |

It is certified that error appears in the above-identified patent and that said Letters Patent is hereby corrected as shown below:

In column 11, line 3, in Claim 12, delete "first" and insert -- of the first --, therefor.

Signed and Sealed this
Fourth Day of December, 2012

David J. Kappos
*Director of the United States Patent and Trademark Office*